J. P. CLIFFORD & S. G. MURRAY.
AUTOMATIC WEIGHING MACHINE.
APPLICATION FILED SEPT. 10, 1912.
1,083,804.
Patented Jan. 6, 1914.
6 SHEETS—SHEET 1.
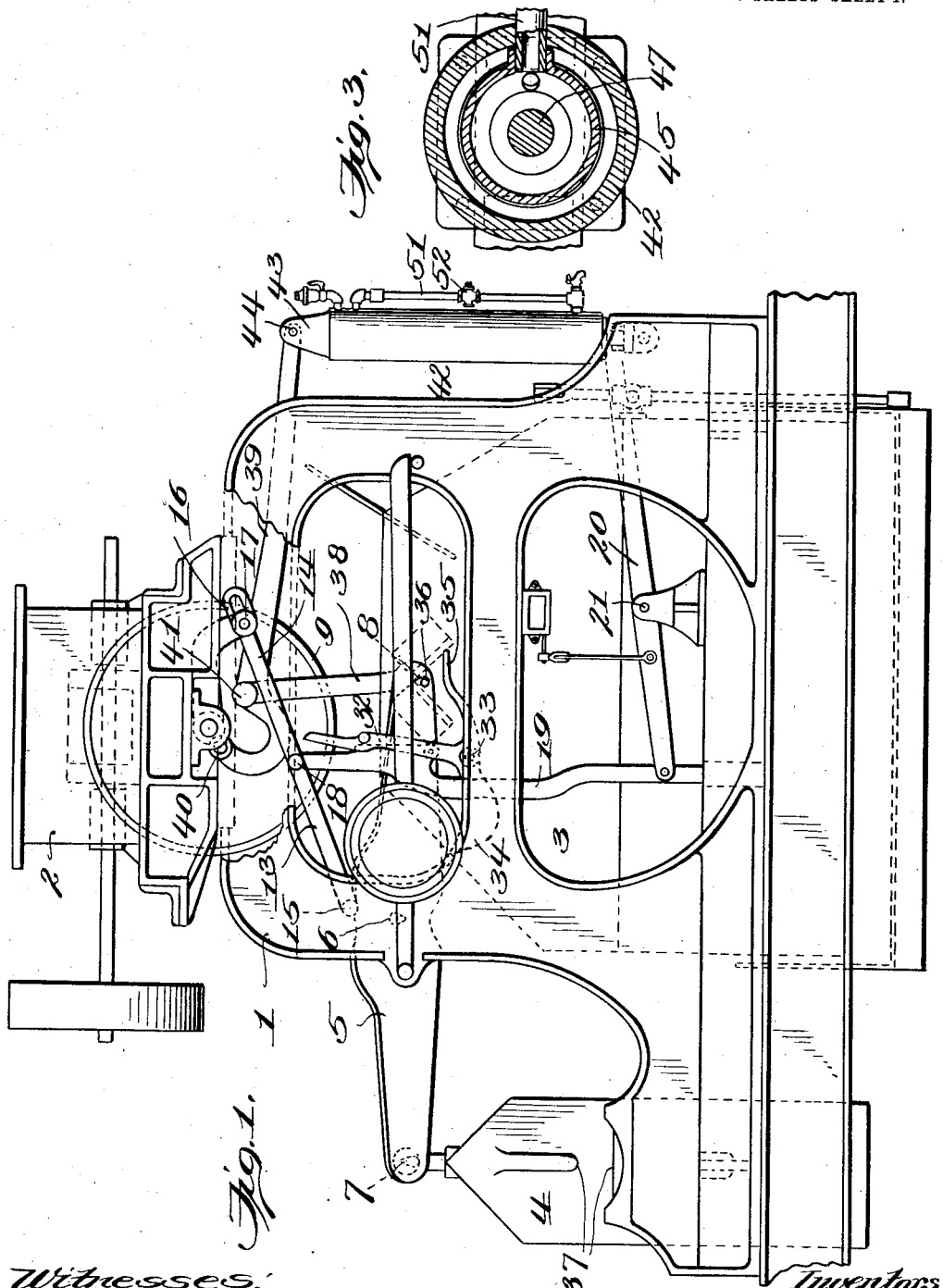

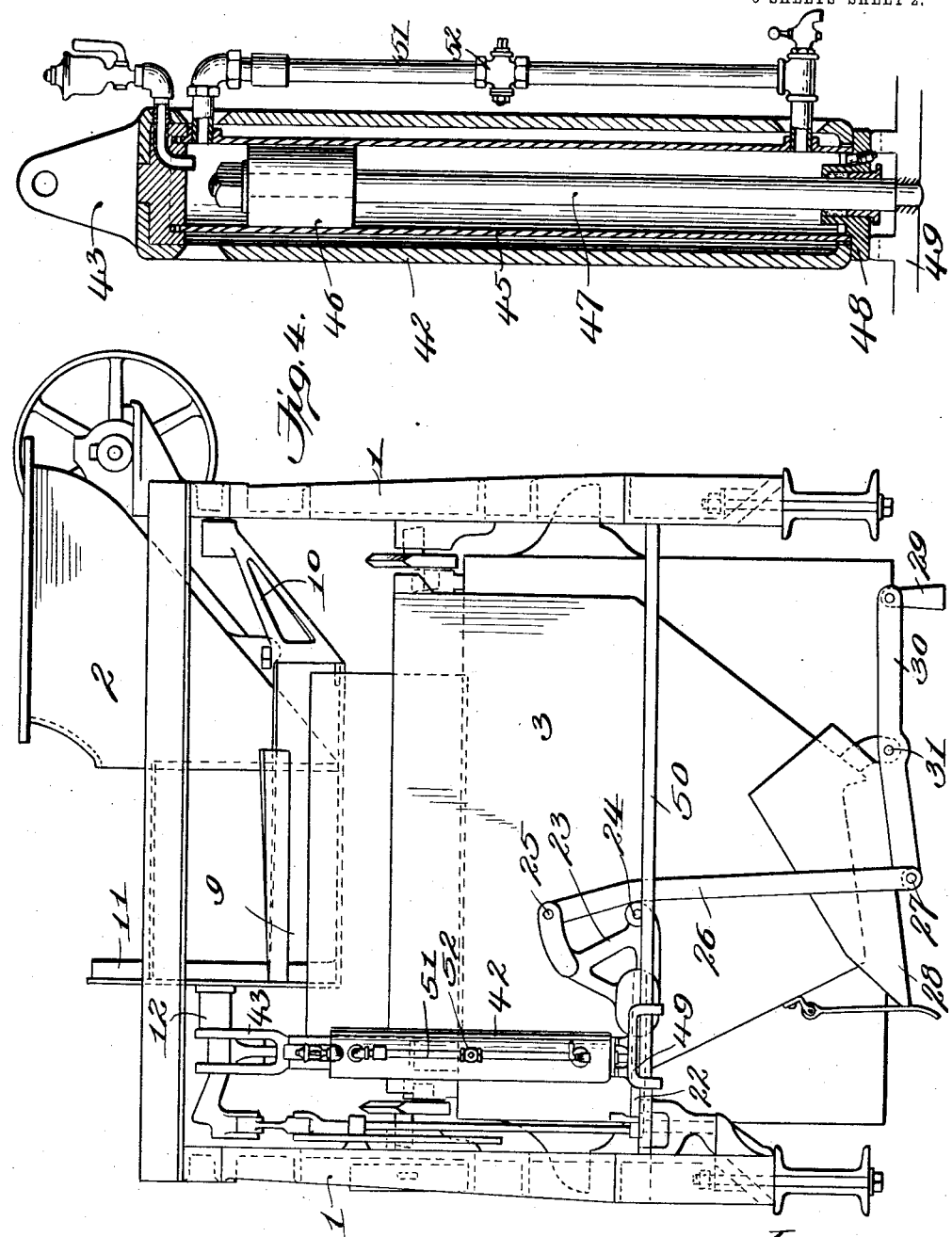

J. P. CLIFFORD & S. G. MURRAY.
AUTOMATIC WEIGHING MACHINE.
APPLICATION FILED SEPT. 10, 1912.
1,083,804.
Patented Jan. 6, 1914.
6 SHEETS—SHEET 3.
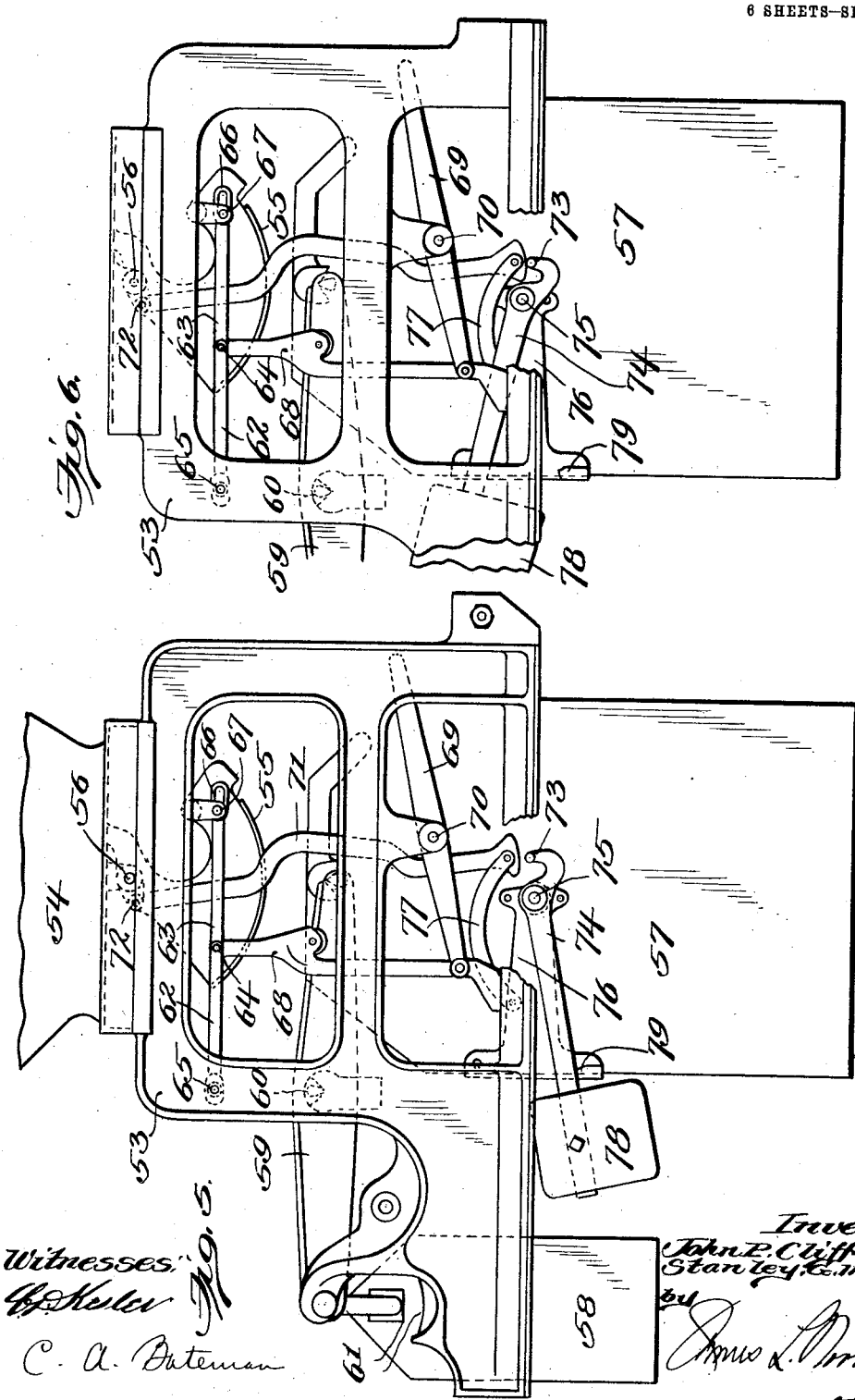

J. P. CLIFFORD & S. G. MURRAY.
AUTOMATIC WEIGHING MACHINE.
APPLICATION FILED SEPT. 10, 1912.
1,083,804.
Patented Jan. 6, 1914.
6 SHEETS—SHEET 4.
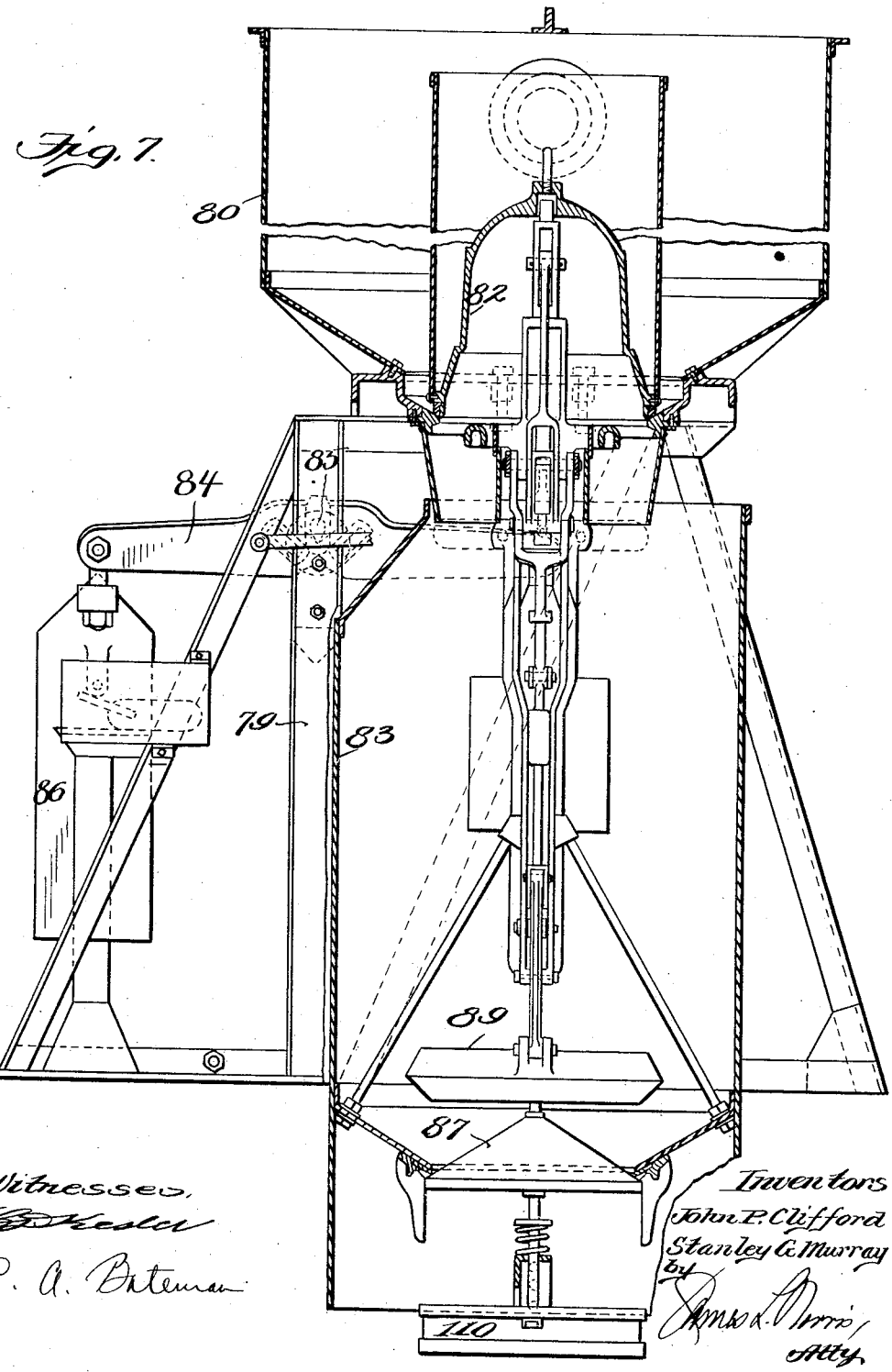

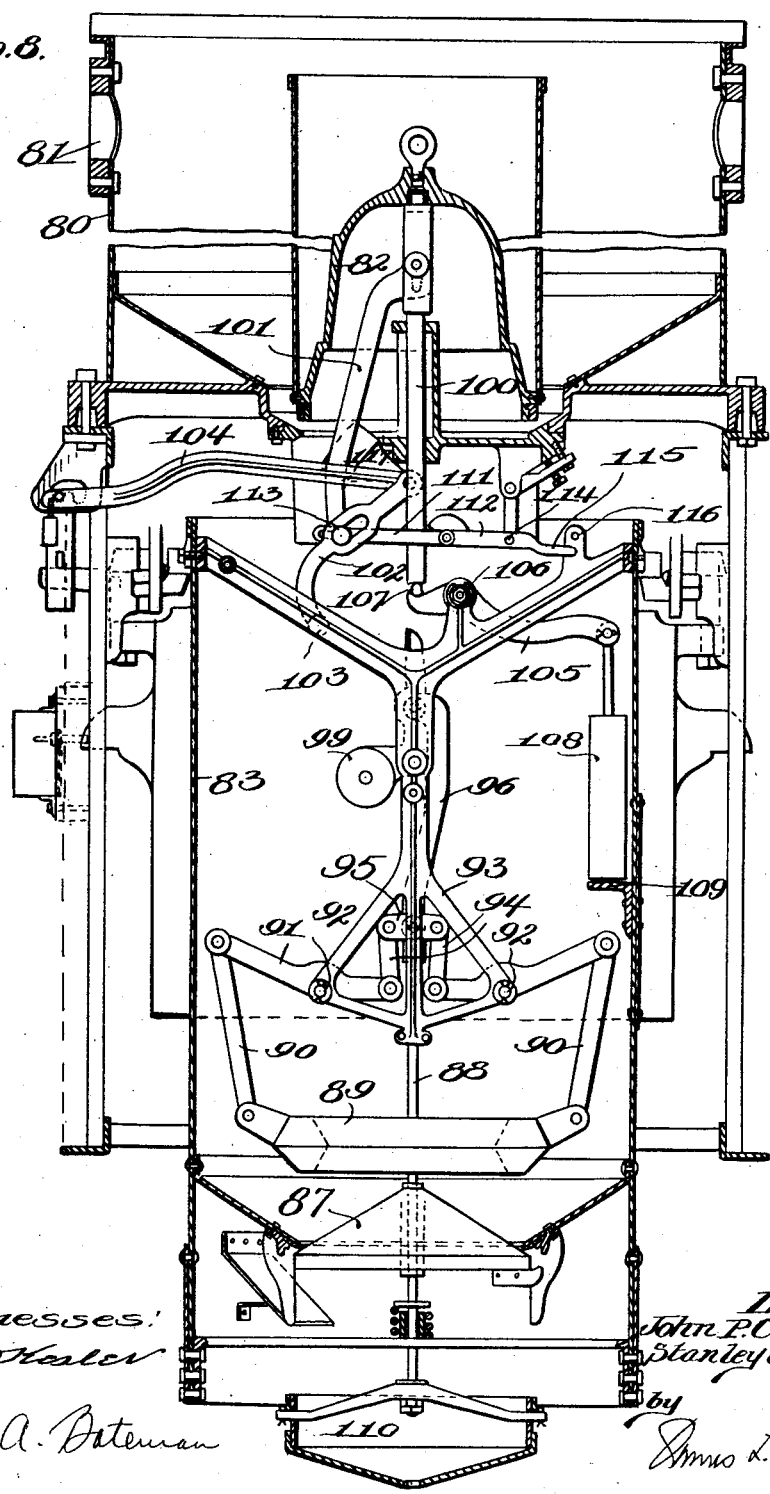

J. P. CLIFFORD & S. G. MURRAY.
AUTOMATIC WEIGHING MACHINE.
APPLICATION FILED SEPT. 10, 1912.
1,083,804.
Patented Jan. 6, 1914.
6 SHEETS—SHEET 6.
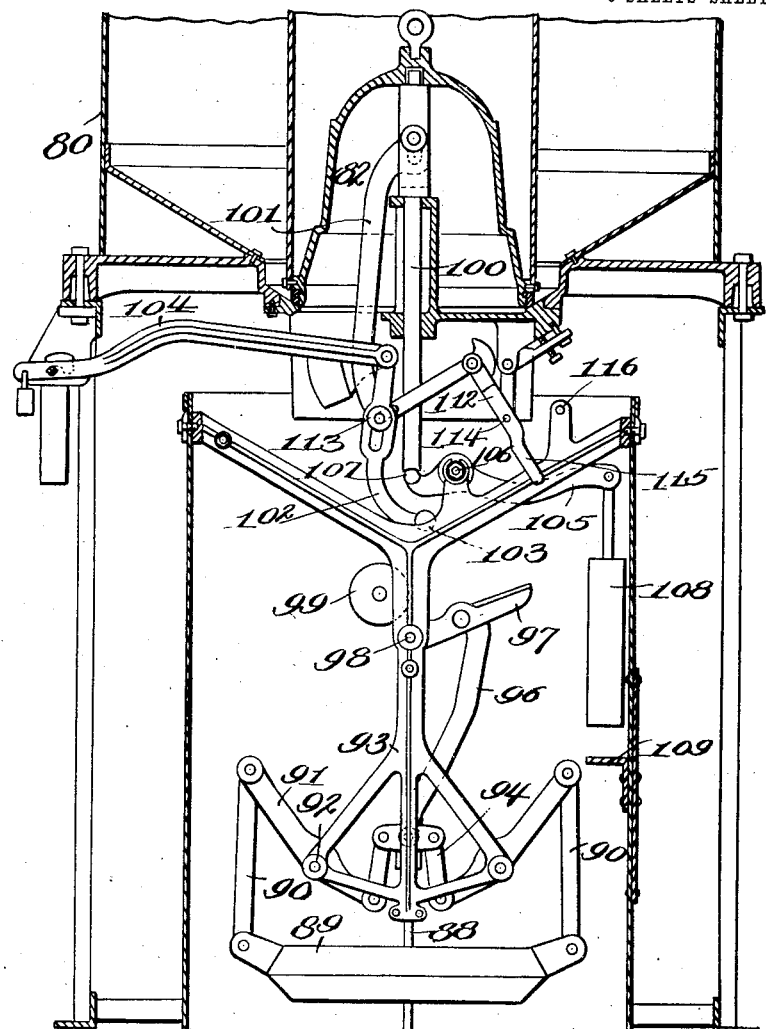
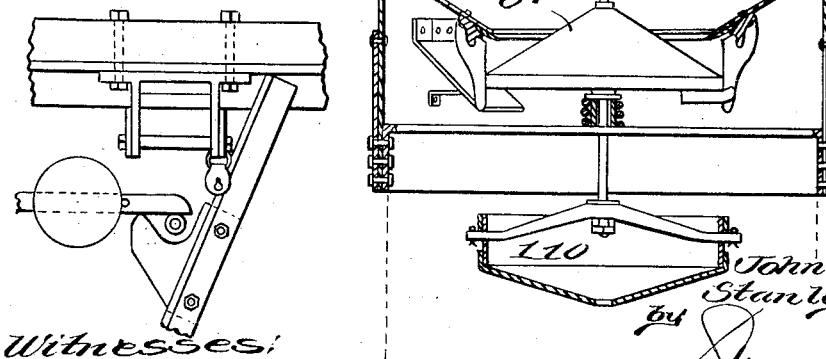

UNITED STATES PATENT OFFICE.

JOHN P. CLIFFORD AND STANLEY G. MURRAY, OF PASSAIC, NEW JERSEY, ASSIGNORS TO RICHARDSON SCALE COMPANY, OF PASSAIC, NEW JERSEY, A CORPORATION OF NEW JERSEY.

AUTOMATIC WEIGHING-MACHINE.

1,083,804.   Specification of Letters Patent.   Patented Jan. 6, 1914.

Application filed September 10, 1912. Serial No. 719,678.

*To all whom it may concern:*

Be it known that we, JOHN P. CLIFFORD and STANLEY G. MURRAY, subjects of the King of Great Britain, residing at Passaic, in the county of Passaic and State of New Jersey, have invented new and useful Improvements in Automatic Weighing - Machines, of which the following is a specification.

The present invention relates to improvements in weighing machines and more especially to those of the automatic type wherein the discharge of each weighed load from the weigh hopper and the opening of the gate or valve for the taking up of the next load are effected automatically, and the primary object of this invention is to provide simple and reliable means for cushioning or avoiding shock during the return of the weigh hopper, counterpoise and related parts to initial position upon the discharge of a load from the weigh hopper and storing or accumulating thereby sufficient power to open the supply gate or valve to commence the next subsequent weighing operation, the apparatus operating more smoothly and quietly than heretofore, wear of the parts is minimized, and the different adjustments of the machine for accurate weighing are not disturbed.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a side elevation of one type of weighing machine embodying the present invention; Fig. 2 is an elevation of the apparatus as shown in Fig. 1 and as viewed from the right; Figs. 3 and 4 represent respectively transverse and longitudinal sections through the weight and cylinder used in this embodiment of the invention; Figs. 5 and 6 represent in elevation the same type of weighing machine equipped with a somewhat modified form of the present invention, the weight being shown in two different positions in these figures; Figs. 7, 8 and 9 represent in vertical section a liquid weighing machine embodying the present invention. Fig. 10 is a fragmentary view of the upper left-hand portion of the weighing machine as shown in Figs. 8 and 9.

Similar parts are designated by the same reference characters in the several views.

The weighing machine shown in Figs. 1 and 2 is of the same type substantially as that disclosed in the patent to Henry Richardson, No. 760,485 granted May 24, 1904, it embodying, briefly, a main frame 1, a supply hopper 2, a weigh hopper or bucket 3 which receives the material from the supply hopper in making up a load, a weight box or counterpoise 4, and a weigh beam 5, the latter being fulcrumed on the main frame 1 at 6 and having at its opposite ends knife edges 7 and 8 which support respectively the weight box, or counterpoise, and the weigh hopper. A valve or gate 9 controls the flow of the material from the supply hopper and into the weigh hopper, this gate or valve in the present instance being of segmental form and pivotally supported at one end by a bracket 10, while its opposite end is supported by a head 11 provided with a supporting shaft 12. This valve is of somewhat different form from that shown in the prior patent aforesaid, but is operated substantially upon the same principle, the gate or valve being locked when closed by a toggle composed of the links 13 and 14, the link 13 being pivoted at 15 to the main frame, while the link 14 is provided with an elongated eye 16 which coöperates with a pin 17 on the supply valve or gate. The middle pivot 18 is connected to a drop bar 19, the latter being connected to a knock-off lever 20 which is fulcrumed at 21, and the opposite end of this knock-off lever is arranged to coöperate with an arm 22 of a bell-crank lever 23, the latter being pivoted on the weigh hopper at 24 and pivotally connected at 25 to a bar 26. The bar 26 is pivotally connected at 27 to a door or gate 28 which controls the discharge of the material from the weigh hopper, a counterpoise 29 being attached to an arm 30 which extends beyond the pivot 31 of the hopper door and such weight tends to close the door. The weight of the toggle members and the drop bar is sustained while the valve is in dribble position by the trigger 32 which is pivoted to the frame at 33 and is provided with a weight 34 which projects from one side of this pivot and tends to move the trigger into coöperative relation with the drop bar, and it has an arm 35 projecting from the opposite side of this pivot arranged to be depressed or engaged by a projection 36 on the weigh beam. The mechanism just described is an example of one form of mechanism whereby the rising of the weigh hopper or bucket to receive its load or charge first opens the supply valve to feed a full flow or loading stream to the hopper, subsequently closes the supply valve or gate partially to reduce the stream to a dribble stream, and finally closing the valve completely to cut off the supply of material when the weigh beam is poised.

In the operation of weighing machines of this general type, particularly weighing machines of large size and capacity, the dumping of the weighed charge or load from the weigh hopper causes the counterpoise to drop suddenly and with considerable force upon its stops 37. According to the present invention, means is provided for retarding the return of the weigh hopper and counterpoise to initial position after each load is discharged from the weigh hopper and utilizing this cushioning force to store up power sufficient to re-open the supply valve or gate preparatory to the commencement of the next weighing operation when the toggle link is unlocked, shock due to the return of the counterpoise to initial position being minimized or avoided, and greater smoothness in the operation of the apparatus being obtained.

In that form of the invention shown in Figs. 1 to 4 inclusive, the pendant 38 which is lifted by the weigh hopper end of the weigh beam when the latter rises operates to open the supply valve or gate through the medium of an interposed lever 39, this lever being pivotally connected at 40 to the supply valve or gate and the pendant pivotally connected to said lever at 41. The opposite end of the lever 39 coöperates with a combined weight and cushion which may be of different constructions. That shown, and which is generally preferred, consists of a weight 42 preferably in the form of a cylindrical shell having lugs 43 which are pivotally connected at 44 to the outer end of the lever 39. This weight contains a cylinder 45 and the cylinder contains a fluid-tight piston 46, the piston rod 47 extending downwardly through a stuffing-box in the lower head 48 of the cylinder and being secured to a cradle 49, the ends of the cradle being mounted to rock on the transverse tie rod 50 which connects the two side members of the frame. A by-pass 51 is provided which establishes communication between the opposite ends of the cylinder, and this by-pass is provided with a valve 52 which is adjustable to vary the effective area of the by-pass and thereby resist, to the desired degree, movement of the piston 46 in the cylinder. In this embodiment of the invention, the weight 42 will act to resist upward movement of that end of the lever 39 to which it is attached, and the cylinder, piston and by-pass will operate as a brake to retard upward movement or lifting of the weight 42 when the lever 39 is acted on by the counterpoise 4. The distances between the centers 40 and 41, and 41 and 44 are so proportioned that the weight 42 will be capable of resisting, to a sufficient degree, the dropping of the counterpoise 4 when the load is discharged from the weigh hopper. Therefore, assuming that a charge has been made up in the weigh hopper and that the supply valve or gate is closed, when this load is discharged from the weigh hopper the relieving of the load upon the weigh hopper end of the weigh beam will cause this end of the beam to rise owing to the action of the counterpoise 4, this rising motion of the weigh hopper end of the weigh beam being transferred to the pendant 38 and the latter in turn transferring the upward movement to the lever 39, causing the latter to tilt about the center 40 as a fulcrum with the result that the weight 42 is lifted and the cylinder 45 is shifted relatively to the piston 46, this relative movement between the cylinder and piston being retarded by the resistance offered to the transfer of the fluid between the two ends of the cylinder by the appropriately set valve 52. The result is that the counterpoise 4 will settle more slowly upon its stops 37, and after the supply valve or gate has been unlocked by the toggle, the weight 42 acting on the lever 39 will operate to open the supply valve under the control, however, of the coöperating cylinder and piston, thereby commencing the next weighing operation.

In that form of the invention shown in Figs. 5 and 6, the weighing machine operates upon the same principle as that disclosed in the prior patent referred to, it comprising, briefly, a main frame 53, a supply chute or hopper 54 having a segmental valve 55, this valve being arranged in this instance directly below the supply hopper and pivoted to swing on an axis 56. A weigh hopper or bucket 57 is arranged below the supply valve or gate and a counterpoise 58 serves to weigh the material in the weigh hopper, the weigh hopper and counterpoise being connected by a weigh beam 59 which is fulcrumed by knife-edges 60 bearing on the side members of the frame, and the opposite ends of the weigh beam are connected in the usual manner to the weigh hopper and counterpoise respectively, the stops 61 serving to arrest the descent of the counterpoise when the load is discharged from the weigh hopper. A toggle serves, as in the preceding case, to lock the supply valve or gate in closed position, this toggle embodying the links 62 and 63 which are pivotally connected by the intermediate pivot 64, the link 62 being pivoted to the frame 65 and the link 63 having an elongated eye 66 which coöperates with a pin 67 attached to the supply valve or gate, a drop bar 68 being connected to the intermediate pivot 64 of the toggle and to a knock-off lever 69, the latter being pivoted at 70. A pendant 71 is pivotally connected to the supply valve or gate at 72, the pendant in this instance being extended downwardly and arranged to coöperate with the upwardly projecting end 73 of a lever 74, the latter being pivoted at 75 on a bracket 76 which is secured to the weigh hopper, the adjacent end of the pendant being held in operative relation to the end 73 of the lever by a link 77. The opposite end of the lever 74 is provided with a weight 78 and the bracket 76 is provided with a stop 79 which serves to limit the downward movement of the weight 78. In this embodiment of the invention, the weight 78 will normally occupy the position shown in Fig. 5. However, after the weigh hopper has descended with a load of material and such material has been discharged therefrom, the rising movement of the weigh hopper, due to the tendency of the counterpoise 58 to drop, causes the end 73 of the lever 74 to be carried up with the weigh hopper and into engagement with the lower end of the pendant 71, the resistance offered by this pendant to the arm 73 of the lever causing the lever 74 to tilt about its axis, and this tilting of the lever is resisted by the weight 78 thereon, this resistance offered by the weight 78 serving to retard and cushion the descent of the counterpoise 58. After the toggle has been operated to unlock the supply valve or gate, the pendant 71 is permitted to rise and open this valve or gate, the power necessary to open the valve or gate being derived from the weight 78.

Figs. 7 to 9 inclusive show the present invention as applied to a somewhat different type of weighing machine which is adapted to the weighing of liquids. In this instance, the weighing machine embodies a main frame 79 which supports a supply hopper 80 in the top thereof, this supply hopper being adapted to receive liquid through an inlet 81 and being provided with a valve 82 which controls the flow of the liquid from the supply hopper into the weigh hopper 83. The weigh beam 84 is fulcrumed on the frame by the knife-edges 85 and a counterpoise 86 serves to counterbalance the weigh hopper, the latter being suspended on the opposite end of the weigh beam. The weigh hopper is provided with a discharge valve 87 which normally closes the bottom thereof, this discharge valve being secured to a vertically movable stem 88, and a weight 89 being provided to close the discharge valve after being opened to discharge the contents of the weigh hopper. This weight in the present instance is annular in form so as to surround the stem 88 and is connected by the links 90 to a pair of arms 91, the latter being pivoted at 92 to a frame 93 which is fixed within the hopper, and the inner ends of the levers 91 being pivotally connected by the links 94 to a head 95, the latter being attached to the valve stem 88. A link 96 is attached to the cross-head 95 and this link in turn is pivotally connected to an arm 97 of a bell-crank lever, this bell-crank lever being pivoted at 98 to the frame 93 and provided with a weight 99 which normally operates in a direction to hold the arm 97 in substantially a vertical position as shown in Fig. 8, thereby locking the discharge valve 87 in closed position.

The valve 82 which controls the flow of the liquid from the supply hopper into the weigh hopper is provided with a stem 100 which, when elevated, lifts this valve from its seat and thereby admits liquid to the weigh hopper. A link 101 is operatively connected to this valve stem 100, the lower end of this link coöperating with the intermediate portion of a lever 102, the lower end 103 of this lever being arranged to engage the arm 97 to unlock the bell-crank which holds the discharge valve 87 in closed position, the upper or opposite end of the lever 102 being pivotally connected to a link 104. A lever 105 is pivoted or fulcrumed at 106 on the frame 93, one end 107 of this lever being arranged to abut against the lower end of the valve stem 100 when the weigh hopper rises, and the opposite end of this lever 105 being attached to a weight 108, the weigh hopper being provided interiorly with a stop 109 which serves to support the weight 108, when the latter is in its lowermost position. A basin 110 having a leakhole of appropriate size may be attached, as shown, to the lower end of the valve stem 88 for the purpose of preventing premature closing of the discharge valve 87. The lever 102 is normally held in inoperative relation to the arm 97 by a toggle composed of the links 111 and 112, the link 111 being attached to the pivot 113 which connects the lever 102 and the link 101, while the link 112 is fulcrumed on the pin 114 and is provided with an extension 115 adapted to engage the under side of a pin 116 which is fixed to the frame 93 in the weigh hopper. A weight 117 operates on the lever 102 to swing the end 103 thereof against the arm 97 when the lever 102 is released by unlocking the toggle links 111 and 112, these toggle links being unlocked as the weigh hopper descends after receiving a full load, the weight 117 then swinging the lever 102 with sufficient force to cause the end 103 thereof to deflect the arm 97 whereby the toggle formed by the link 96 and the member 97 is unlocked, permitting opening of the weigh hopper discharge valve 87 by the liquid pressure acting thereon, and after the load in the weigh hopper has been discharged, the weigh hopper will rise under the influence of the counterpoise 86, carrying the lever 105 upwardly, and causing the end 107 of this lever to strike the lower end of the valve stem 100, the resistance offered to the lever 105 by the valve stem 100 causing the weight 108 acting on this lever to be lifted into the position shown by the full lines in Fig. 9, the weight 108 thereby acting to absorb shock due to the dropping of the counterpoise, and after the counterpoise for the weigh hopper has settled down on its stops, this weight will then supply the power necessary to open the supply valve or gate and thereby admit fluid to the weigh hopper for the next weighing operation. In each instance, the weight interposed between the supply valve or gate and the weighing mechanism operates to retard the return of the weigh hopper, counterpoise and related parts to initial position after the load is dumped or discharged from the weigh hopper, thus cushioning or absorbing the shock which would otherwise occur, and by the same operation, sufficient power is stored to open the supply valve or gate when the same is unloaded. In each embodiment of the invention shown, the weight is inoperative when the weighing operation has commenced, and hence this weight has no effect on the weighing operation.

What is claimed is:—

1. The combination of a counterpoised weigh hopper, a supply valve therefor, and a weight operative during the return of the weigh hopper to initial position for cushioning such return and for storing power sufficient to subsequently open the supply valve.

2. The combination of a counterpoised weigh hopper, a supply valve therefor, and a weight operative during the return of the weigh hopper to initial position for storing power to open the supply valve, such weight being inactive during the weighing operation.

3. The combination of a counterpoised weigh hopper, a supply valve therefor, and a movable weight interposed between the weigh hopper and supply valve and operative during the return of the weigh hopper to initial position after discharging its load to retard such return and to store power sufficient to open the supply valve.

4. The combination of a counterpoised weigh hopper, a supply valve therefor, a movable weight interposed between the weigh hopper and supply valve and operative during the return of the weigh hopper to initial position after discharging its load to retard such return and to store power sufficient to open the supply valve, and a stop supporting the weight in inactive position during the weighing operation.

5. The combination of a counterpoised weigh hopper, a supply valve therefor, and a fluid-controlled cushion operative to retard the return movement of the weigh hopper to initial load-receiving position.

6. The combination of a counterpoised weigh hopper, a supply valve therefor, and a combined weight and fluid-controlled cushion operative to retard the return movement of the weigh hopper to initial load-receiving position and for storing power to open the supply valve.

7. The combination of a counterpoised weigh hopper, a supply valve therefor, a combined weight and fluid-controlled cushion, a lever connected at one end to the supply valve and at its opposite end to said weight and cushion, and means arranged to act with an upward force on an intermediate part of said lever when the weigh hopper rises upon dumping a load therefrom.

8. The combination of a counterpoised weigh hopper, a supply valve therefor, and a combined weight and fluid-controlled cushion, the weight being movable vertically and connected to the supply valve and carrying a cylinder, a relatively stationary piston in the cylinder, and means for controlling the flow of fluid between the ends of the cylinder during the vertical movements of the weight and cylinder.

In testimony whereof we have hereunto set our hands in presence of two subscribing witnesses.

JOHN P. CLIFFORD.
STANLEY G. MURRAY.

Witnesses:
  W. GRAFTON BATEMAN,
  HARRY F. MASTERS.

---

Copies of this patent may be obtained for five cents each, by addressing the "Commissioner of Patents, Washington, D. C."